(12) United States Patent
Gumpoltsberger

(10) Patent No.: US 6,540,639 B1
(45) Date of Patent: Apr. 1, 2003

(54) CONTINUOUSLY VARIABLE TRANSMISSION FOR A MOTOR VEHICLE

(75) Inventor: Gerhard Gumpoltsberger, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/857,858

(22) PCT Filed: Dec. 13, 1999

(86) PCT No.: PCT/EP99/09858

§ 371 (c)(1),
(2), (4) Date: Jun. 11, 2001

(87) PCT Pub. No.: WO00/37829

PCT Pub. Date: Jun. 29, 2000

(30) Foreign Application Priority Data

Dec. 18, 1998 (DE) .......................... 198 58 553

(51) Int. Cl.[7] .............................. F16H 37/02
(52) U.S. Cl. ...................... 475/215; 475/216
(58) Field of Search ............... 475/207, 211, 475/215, 216

(56) References Cited

U.S. PATENT DOCUMENTS

| | | | |
|---|---|---|---|
| 4,885,955 A | 12/1989 | Kraus | 74/691 |
| 5,194,052 A | 3/1993 | Ueda et al. | 475/66 |
| 5,401,221 A | 3/1995 | Fellows et al. | 475/214 |
| 5,445,580 A | 8/1995 | Parraga Garcia | 477/211 |
| 5,453,061 A | 9/1995 | Fellows | 475/215 |
| 5,980,414 A | * 11/1999 | Larkin | 475/219 |

FOREIGN PATENT DOCUMENTS

| | | | | |
|---|---|---|---|---|
| DE | 35 43 635 A1 | 6/1986 | .......... | B60K/17/06 |
| DE | 197 03 544 A1 | 8/1998 | .......... | F16H/37/08 |
| EP | 0 003 408 B1 | 8/1979 | .......... | F16H/37/02 |
| EP | 0 105 515 A1 | 4/1984 | .......... | F16H/37/08 |
| EP | 0 177 241 A2 | 4/1986 | .......... | F16H/37/08 |
| GB | 2 100 372 A | 12/1982 | .......... | F16H/37/02 |
| GB | 2 115 091 A | 9/1983 | .......... | F16H/37/08 |
| WO | 98/34051 | 8/1998 | .......... | F16H/37/08 |

* cited by examiner

*Primary Examiner*—Sherry Estremsky
(74) *Attorney, Agent, or Firm*—Davis & Bujold, P.L.L.C.

(57) ABSTRACT

A continuously variable transmission (1) for a vehicle comprising one variator (4) with a non-positive, special friction-type, power transmission such as a friction gear or a conical disk continuously variable transmission is described wherein the transmission input power can be divided into at least two performance ranges and can be transmitted in a first performance range either by means of a first power split (2) via the variator (4) or by means of a second power split (3) by-passing the variator (4), or by means of both power splits (2, 3). According to the invention the transmission performance is power split in the first and second performance ranges.

10 Claims, 3 Drawing Sheets ant's WO 98/34051. The problem to be solved by the # CONTINUOUSLY VARIABLE TRANSMISSION FOR A MOTOR VEHICLE

FIELD OF THE INVENTION

The invention concerns a continuously variable transmission for a vehicle comprising one variator with a non-positive, special friction-type power transmission such as a friction gear with interacting toroidal treads disposed in pairs between which roller bodies rotate, or a conical disk continuously variable transmission and a first planetary gear. The transmission input power can be divided in at least two performance ranges wherein, in one performance range, the power can be transmitted either by a first power split from a transmission input via the variator, the same as the first planetary gear, to a transmission output or by a second power split from the transmission input via a mechanical split by-passing the variator to the first planetary gear and the transmission output, or power split by means of both power splits.

BACKGROUND OF THE INVENTION

Such a friction gear is already known from the Applicant's WO 98/34051. The problem to be solved by the invention was to improve, with regard to total efficiency achievable, a transmission operated in two performance ranges and, furthermore, to be able to adapt the transmission with basically the same design to different installation conditions. In the second performance range, the transmission input power is transmitted to the output shaft with a power split in the transmission.

In such a continuously variable vehicle transmission, a reduction of the torque in the variator is proposed only in one performance range as it is known from the prior art. From the field of hydrostatic transmissions, power split transmissions, which disadvantageously have a strong noise development with poor efficiency and also high costs of production, are further known.

The problem to be solved by this invention is to provide a continuously variable vehicle transmission which overcomes the above mentioned disadvantages and especially makes a reduction of the variator load over the whole performance range and an improved efficiency possible.

SUMMARY OF THE INVENTION

The problem is solved, according to the invention, in a general vehicle transmission by the fact that the transmission power is split both in the first and in the second performance ranges and can be transmitted from the transmission input to the transmission output, via the first and the second power splits. By virtue of such a split power transmission in the first and in the second performance ranges, a continuously variable vehicle transmission results which advantageously makes a small variator load in both performance ranges possible in comparison to a transmission without a power split or to a transmission which has power split in only one performance range. A better efficiency of the continuously variable vehicle transmission is further obtained by the power split. Compared to the transmission without a power split, a greater transmission spreading is advantageously made possible.

In one special development of the invention, it is proposed to provide a second planetary gear, for power split in both performance ranges, and then to add up again in the first or the second planetary gear the two power portion which have been passed via the first and second power splits. It is thus advantageously obtained, a simple and economical means of implementing the power split in both performance ranges of the above mentioned vehicle transmission.

At least one of the two planetary gears is advantageously situated in the power flow between the transmission input and the transmission output parallel to the variator or also located downstream of the variator.

In one development, both planetary gears are disposed in the power flow parallel to each other between the transmission input and the transmission output.

The first and the second planetary gears are advantageously disposed so that in the first performance range the variator is connected with the sun gear of the first planetary gear, the transmission input with the planet carrier and the transmission output with the ring gear of the first planetary gear.

In addition, the first and the second planetary gears are disposed so that in the second performance range, the variator is connected with the ring gear of the second planetary gear, the transmission input with the sun and the transmission output with the stem of the second planetary gear.

In a preferred design of the invention, at least two clutches are provided for connecting the two planetary gears which are situated in different places in the transmission according to the utilization of the transmission or to possibilities of installation.

Both clutches can be shifted so that one planetary gear can be loaded with power and the other planetary gear rotate along idly without power transmission.

In one development, both clutches are situated in the mechanical power split parallel to the variator.

To shift a reverse gear, one brake parallel to both clutches is advantageously provided according to the preceding design.

In one other development, it is proposed that both clutches be provided in the power split of the variator and be located downstream thereof. Thereby both clutches are advantageously loaded with low torque.

In another development, both clutches are situated between the two planetary gears and the transmission output.

In a special development of the invention, in the first performance range, the vehicle is driven out of a neutral geared position of the transmission both in forward and in reverse. For driving in geared neutral, no other driving element with a slip regulation, such as a converter or a friction clutch, is basically required. Besides, an additional reverse gear is not necessary, since it results from the ratio of the continuously variable transmission.

BRIEF DESCRIPTION OF THE DRAWING(S)

Other objects, features, advantages and possible uses of the invention result from the description that follows of the embodiments which are shown in the drawings.

DETAILED DESCRIPTION OF THE INVENTION

Figure 1:
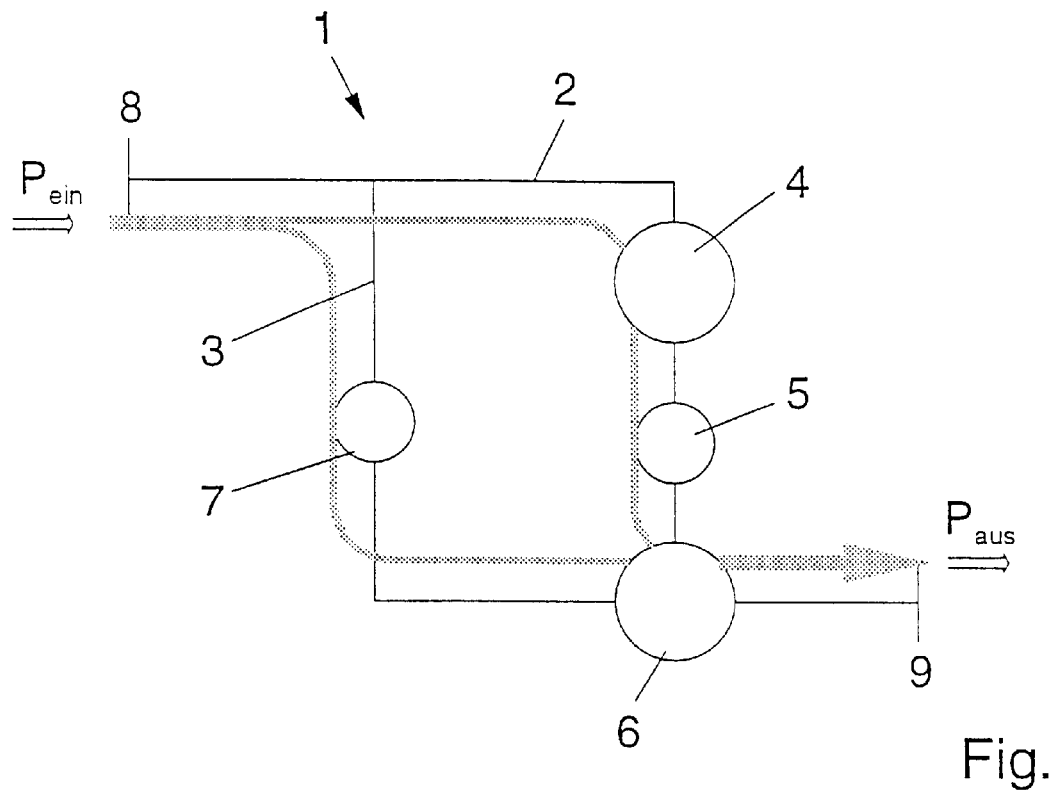
FIG. 1 is a basic representation of the power split in a continuously variable transmission.

In a continuously variable transmission 1, the power split (FIG. 1), such as known from the prior art, is as follows:

A power delivered by a prime mover (not shown) is made available as transmission input power P_ein on the transmission input 8. In the transmission 1, situated in a first power split 2, are a variator 4 with a reduction step 5 located downstream thereof and a first planetary gear 6. Parallel to the first power split 2, a second power split 3 is provided which has a reduction step 7. One part of the total power existing on the transmission input 8 is passed through the variator 4, the other part bypasses the variator 4 via the mechanical power split 3. Both portions are then added up again in the first planetary gear 6 and made available as the transmission output power P_aus. The power is divided in a defined manner, i.e. the power portions in the variator 4 and in the mechanical split 3 result in accordance with the total reduction ratio.

In FIGS. 2 to 5 that follow, different designs of a continuously variable vehicle transmission with one variator 4 and two planetary gears 6 and 10, according to the invention, are shown and the parts that recur in the individual figures are designated with the same numerals for the sake of simplicity.

All FIGS. 2 to 5 have here the same basic arrangement of the essential components, these are: the variator 4, with the reduction step 5 located downstream, and the reduction step 7, disposed parallel thereto and the downstream located planetary gears 6 and 10.

Figure 2:
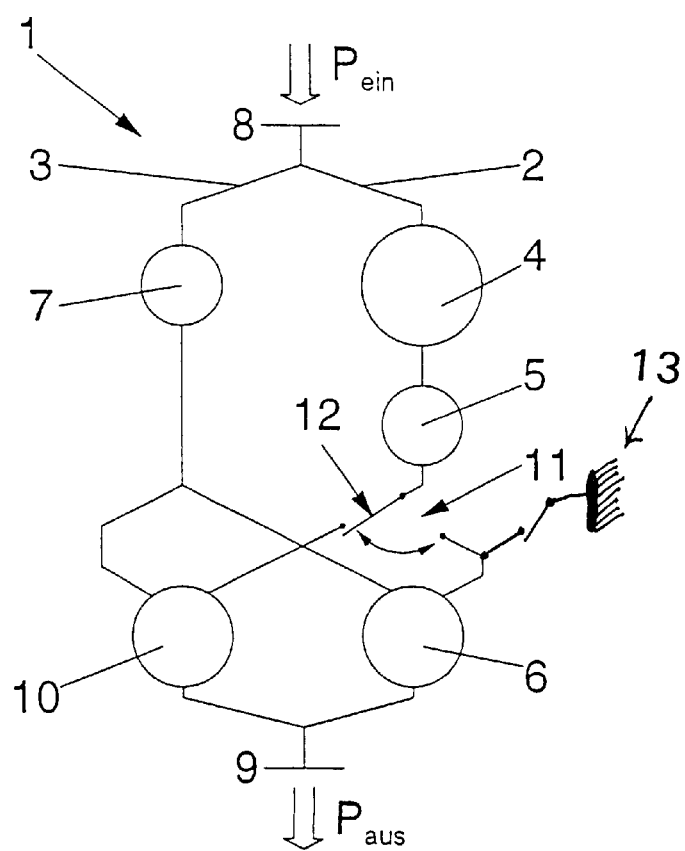
FIGS. 2 to 5 are design variants of a basic representation of the inventive continuously variable transmission with a variator and two planetary gears.

In the design of FIG. 2, first and the second clutches 11, 12 are placed in the first power split 2 between the reduction step 5 and the two planetary gears 6 and 10. Hence as shown, for example, the second clutch 12 is engaged, the power split takes place via the two power splits 2 and 3, the two power portions being added up again in the second planetary gear 10 while the first planetary gear 6 rotates along idlely. In such an arrangement of the clutches 11 and 12, these are advantageously loaded with only a low torque since the passed power portion passed, via the variator 4, is significantly reduced compared to the power portion which would have been passed via the variator without a power split.

In an alternative form of arrangement of the clutches (FIG. 3), these are placed in the second power split 3 between the reduction step 7 and the two planetary gears 6 and 10. In the design shown here, with second clutch 12 engaged, the two power portions are added up in the first planetary gear 6 while the second planetary gear 10 over the disengaged first clutch 11 is not engaged and thus rotates along idlely.

In another possible form of arrangement (FIG. 4), the two clutches 11 and 12 are disposed between the two planetary gears 6 and 10 and the transmission output 9. In the arrangement reproduced here, with engaged second clutch 12 engaged, the power portions are added up in the first planetary gear 6 while the second planetary gear 10 rotates along idlely through the disengaged first clutch 11. By virtue of this arrangement of the two clutches 11 and 12 on the transmission output, the engaged clutch is loaded with the full transmission output torque.

Figure 3:
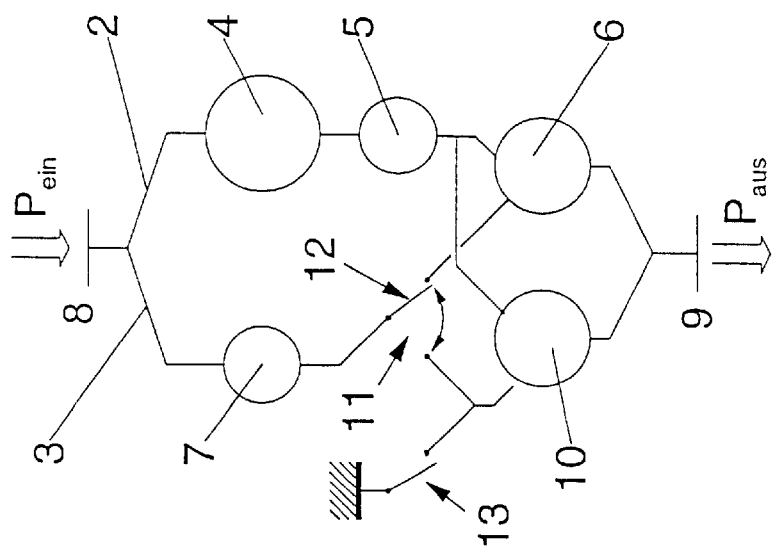
Figure 4:
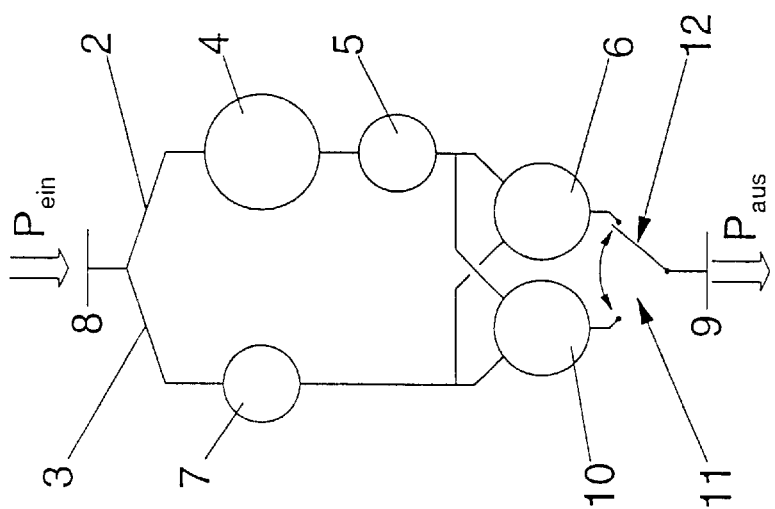
Figure 5:
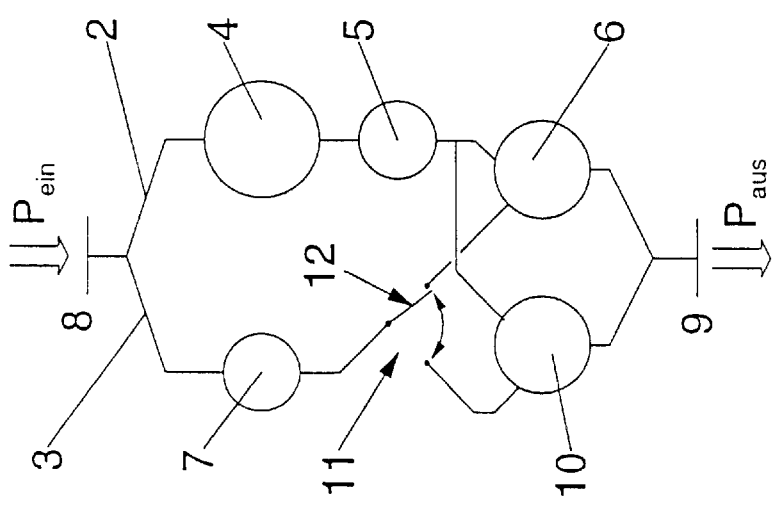

The representation, according to FIG. 5, corresponds essentially to the arrangement of FIG. 3, but in the latter for the reverse gear range of the transmission, a brake 13 is provided to both clutches 11 and 12. Movement in the forward direction occurs, for example, by an engaged first clutch 11 or also with the geared neutral. To move in a reverse gear direction, the brake 13 is engaged and the two clutches 11 and 12 disengaged so that a torque, with a reverse direction of rotation, is made available at the transmission output 9.

Figure 6:
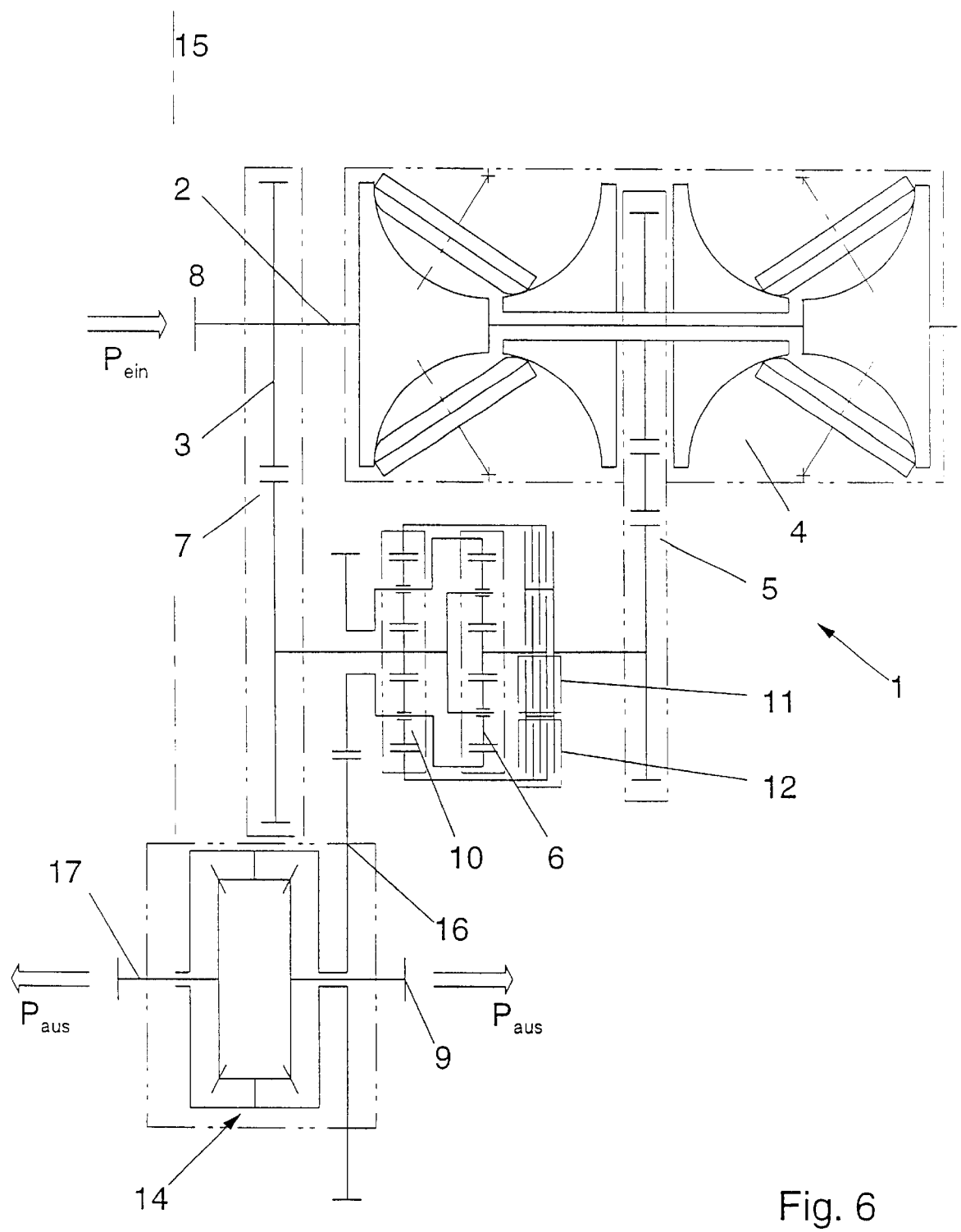
FIG. 6 is a diagrammatic representation of a continuously variable transmission with a power split for a front-transverse arrangement in a motor vehicle in diagrammatic representation.

For a front-transverse arrangement (FIG. 6) of the inventive transmission in a vehicle, the variator 4, the planetary gears 6 and 10 and a differential 14 are consecutively arranged so that their main axles are respectively parallel to each other and extend across the vehicle longitudinal axis 15. Behind the transmission input 8, a power split occurs via the first power split 2 to the variator 4 and via the second power split 3 and a reduction step 7 to the planetary gears 6 and 10. On the variator 4, in turn, a mechanical reduction step 5 is located downstream and is connected, via the clutches 11 and 12, with the planetary gears 6 and 10. The transmission output power P_aus, from the transmission output 9, is divided between the two input shafts 16 and 17 via the differential 14.

What is claimed is:

1. A continuously variable transmission (1) for a vehicle having one variator (4) with a friction power transmission where a transmission input power (P_ein) is dividable in to at least a first and second performance ranges and where the power flow is diverted into at least two power portions by at least a first and second split power in the performance ranges, the continuously variable transmission comprising:
    at least a first planetary gear (6) and a second planetary gear (10);
    at least a first clutch (11) and a second clutch (12) for shifting the first and the second planetary gears (6, 10);
    a transmission input;
    a transmission output;
    a mechanical power split;
    a brake;
    in at least one performance range the transmission input power can be transmitted by the first power split (2) from the transmission input (8), via the variator (4) and the first planetary gear (6), to the transmission output (9), and by the second power split (3) from the transmission input (8), via the mechanical power split by-passing the variator (4), to the first planetary gear (6) and the transmission output (9),
    wherein the brake (13) is provided parallel to the first and second clutch (11, 12) for shifting a reverse gear of the continuously variable transmission (1).

2. The continuously variable transmission according to claim 1, wherein the second planetary gear (10) is provided for both the first and second performance ranges for power splitting and each of the first and second power splits (2, 3) are then recombined in one of the first and the second planetary gears (6, 10).

3. The continuously variable transmission according to claim 1, wherein at least one planetary gear (6 or 10) in the power flow is arranged between the transmission input (8) and the transmission output (9) and is one of arranged parallel to the variator (4) and located downstream of the variator (4).

4. The continuously variable transmission according to claim 1, wherein the first and second planetary gears (6, 10) are arranged parallel to one another in the power flow.

5. The continuously variable transmission according to claim 1, wherein the first and second planetary gears (6, 10) are arranged so that, in the first performance range, the variator (4) is coupled with a sun gear, the transmission input (8) is coupled with a planet carrier and the transmission output (9) is coupled with a ring gear of the first planetary gear (6).

6. The continuously variable transmission according to claim 1, wherein the first and second planetary gears (6, 10) are arranged so that, in the second performance range, the variator (4) is connected with a ring gear of the second planetary gear (10), the transmission input (8) is coupled with the sun gear and the transmission output (9) is coupled with a stem of the second planetary gear (10).

7. The continuously variable vehicle transmission according to claim 1, wherein both clutches (11, 12) are shiftable so that each time one of the first and the second planetary gears (6 or 10) is loaded with power and the other of the first and the second planetary gears (10 or 6) rotates without power transfer.

8. The continuously variable vehicle transmission according to claim 7, wherein both clutches (11, 12) are arranged parallel to said variator in the mechanical power split (3).

9. The continuously variable transmission according to claim 1, wherein the first and second clutches (11, 12) are located downstream of the variator (4) in the first power split (2).

10. The continuously variable transmission according to claim 1, wherein in the first power performance range, in a geared neutral position of the transmission (1), the vehicle can be moved in both a forward direction and a reverse direction.

* * * * *